US007487919B2

(12) United States Patent
Giering et al.

(10) Patent No.: US 7,487,919 B2
(45) Date of Patent: Feb. 10, 2009

(54) SYSTEM FOR CHECKING THE SECURITY FEATURES OF DOCUMENTS OF VALUE

(75) Inventors: Thomas Giering, Kirchseeon (DE); Gerhard Schwenk, Puchheim (DE)

(73) Assignee: Giesecke & Devrient GmbH, Munich (DE)

( * ) Notice: Subject to any disclaimer, the term of this patent is extended or adjusted under 35 U.S.C. 154(b) by 33 days.

(21) Appl. No.: 10/574,661

(22) PCT Filed: Oct. 5, 2004

(86) PCT No.: PCT/EP2004/011134

§ 371 (c)(1), (2), (4) Date: Jan. 12, 2007

(87) PCT Pub. No.: WO2005/036480

PCT Pub. Date: Apr. 21, 2005

(65) Prior Publication Data

US 2007/0095891 A1 May 3, 2007

(30) Foreign Application Priority Data

Oct. 8, 2003 (DE) ................................ 103 46 635

(51) Int. Cl.
*G06K 19/06* (2006.01)

(52) U.S. Cl. .......................... 235/491; 235/487; 283/72

(58) Field of Classification Search ................. 235/491, 235/449, 383, 485, 446, 487; 282/72, 93, 282/91; 382/135, 137

See application file for complete search history.

(56) References Cited

U.S. PATENT DOCUMENTS 5,790,693 A * 8/1998 Graves et al. ............... 382/135
5,974,150 A 10/1999 Kaish et al.
5,992,600 A 11/1999 Baudat
6,104,036 A * 8/2000 Mazowiesky ............... 250/556
6,155,605 A * 12/2000 Bratchley et al. ............. 283/72
6,255,948 B1 * 7/2001 Wolpert et al. ........... 340/572.8
6,438,262 B1 * 8/2002 Bernardini et al. .......... 382/135
6,686,074 B2 2/2004 Muth et al.
6,981,648 B1 * 1/2006 Inaba et al. ................. 235/488
2001/0022259 A1 * 9/2001 Sawa et al. .................. 194/302
2002/0105633 A1 8/2002 Gardner et al.
2002/0130303 A1 9/2002 Muth et al.
2002/0131618 A1 9/2002 Ahlers et al.
2003/0110011 A1 6/2003 Satoshi
2003/0110110 A1 6/2003 Dietz et al.
2003/0168849 A1 9/2003 Reinisch
2004/0145726 A1 * 7/2004 Csulits et al. ................. 356/71
2005/0156116 A1 * 7/2005 Schuett et al. .............. 250/372

FOREIGN PATENT DOCUMENTS

DE 23 66 274 C2 11/1973

(Continued)

*Primary Examiner*—Edwyn Labaze
(74) *Attorney, Agent, or Firm*—Bacon & Thomas, PLLC

(57) ABSTRACT

The invention relates to a system for checking the security features of documents of value with at least one sensor in areas of different security categories.

Since dependent on the security category different sensor parameters are made available for the respective checking of the security feature, so as to check the same security feature in different ways, the preparing of forgeries can be prevented particularly reliably.

18 Claims, 1 Drawing Sheet

FOREIGN PATENT DOCUMENTS

| | | | |
|---|---|---|---|
| DE | 101 13 268 | A1 | 9/2002 |
| DE | 101 54 342 | A1 | 5/2003 |
| EP | 0 779 604 | | 6/1997 |
| EP | 1 182 048 | | 2/2002 |
| GB | 1439 173 | | 6/1976 |
| WO | WO 97/39428 | | 10/1997 |
| WO | WO 00/19428 | | 4/2000 |
| WO | WO 01/97180 | A2 | 12/2001 |

* cited by examiner

SYSTEM FOR CHECKING THE SECURITY FEATURES OF DOCUMENTS OF VALUE

FIELD OF THE INVENTION

The invention relates to a system for checking the security features of documents of value with at least one sensor in areas of different security categories.

BACKGROUND

Security features within the meaning of the present application are feature substances, which are incorporated in and/or applied to the document of value e.g. in the form of pigments. A pertinent checking system is known for example from WO 97/39428. This document teaches, that a bank note shall contain a high-security feature, incorporated in or applied to the paper, consisting of a mixture of two different substances and a low-security feature consisting of another substance. In a high-security area, such as e.g. a bank, the high-security feature is checked, whereas in a low-security area, such as e.g. in publicly accessible vending machines, only the low-security feature is checked.

By incorporating different security features with different characteristic properties into bank notes, a simple checking of the low-security feature is enabled in areas without high demands on security, such as e.g. in the trade, while the high-security feature is checked only in high-security areas, i.e. e.g. by users with a higher security category.

Such an incorporation of different feature substances for different security categories, however, increases the effort required for a suitable selection of appropriate feature substances and thus for the production of the pertinent documents of value.

SUMMARY

On these premises it is the problem of the present invention to make available a system for checking the security features of documents of value with at least one sensor in areas of different security categories, which constitutes an alternative to this known system.

This problem is solved by the system according to claim 1. The further claims describe preferred designs.

The invention is based on the idea, that in areas with different security categories the checking of the same security feature is carried out in different ways, using different sensor parameters for different security categories.

In contrast to the known system of WO 97/39428, wherein different substances are used as security features for different security categories, according to the invention the same substance can be used for all security categories, the substance, however, has to be checked in different ways by the users in areas of different security categories. The inventive proceeding is particularly suitable for the checking of the luminescence radiation of feature substances in or on bank notes.

Within the meaning of the present invention the different security categories can be determined e.g. by checking whether the inventive sensor check shall be employed in a high-security area, to which only specifically authorized persons have access, or in a low-security area, such as e.g. in a vending machine, which is installed freely accessible for everybody.

This inventive different checking of the same security feature in security areas of different security categories can be specifically realized e.g. as follows, in areas of a lower security category the checking is based on a checking of a property of the security feature, and only in areas with a higher security category the same property of the security feature is checked with a higher accuracy and/or another property than in areas with a lower security category is checked.

When measuring the same property of the same security feature with a different accuracy this can e.g. mean, that a producer of sensors provides for customers operating in areas with a low security category, such as e.g. producing vending machines, only such sensors which can measure this property with a lower accuracy than sensors, which the producer of sensors provides for customers, such as e.g. banks, with a higher security category.

The provision of different sensor parameters can be effected by making available sensors with different measuring properties or sensors with the same measuring properties but different evaluation algorithms according to the respective security category. In other words, for this purpose either the sensor hardware and/or the sensor software can be differently chosen.

The inventive principle shall be illustrated by way of example with the help of the especially preferred example of checking the luminescence radiation of luminescent substances as security feature in bank notes. But the invention can also be used for checking other documents of value, such as e.g. checks, chip cards, ID cards, passports or the like.

In this case can be provided that for example the sensors used in vending machines, which usually are installed without high demands on security and freely accessible for everyone, can check the luminescent radiation with a lower accuracy, i.e. e.g. with smaller spectral resolution, than sensors, which are made available to the banks for checking the same security feature. The measuring with different sensor parameters in this connection can also mean e.g. measuring other properties of the luminescence radiation or checking in a different spectral region. Furthermore, e.g. also the decay behaviour of the luminescence radiation can be measured and in areas with different security categories the measuring can also be effected in different ways and/or with a different accuracy. In application of the teaching of WO 00/19428 e.g. from the measured decay curve depending on the security category a different number of decay times can be determined, so as to be able to evaluate the measured curve with a different accuracy.

In case of luminescence measuring, especially preferred in the area of a low security category only the envelope of the spectral course of the security feature can be checked, while only in areas with a higher security category the spectral course can be checked with a higher spectral resolution, so as to be able to determine substructures of the envelope and thus more exact details of the security features contained in the document of value.

Further advantages of the present invention can be seen from the dependent claims and the following description of embodiments with the help of the attached Figures.

DETAILED DESCRIPTION OF VARIOUS EMBODIMENTS

Although not restricted to this, in the following especially the checking of such bank notes is dealt with, which have feature substances with characteristic properties incorporated in or applied to the bank note paper. Sensors for measuring such security features can be used e.g. in bank note counting apparatuses or bank note sorting apparatuses, bank note depositing machines or bank note dispensers or in vending machines.

Figure 1:
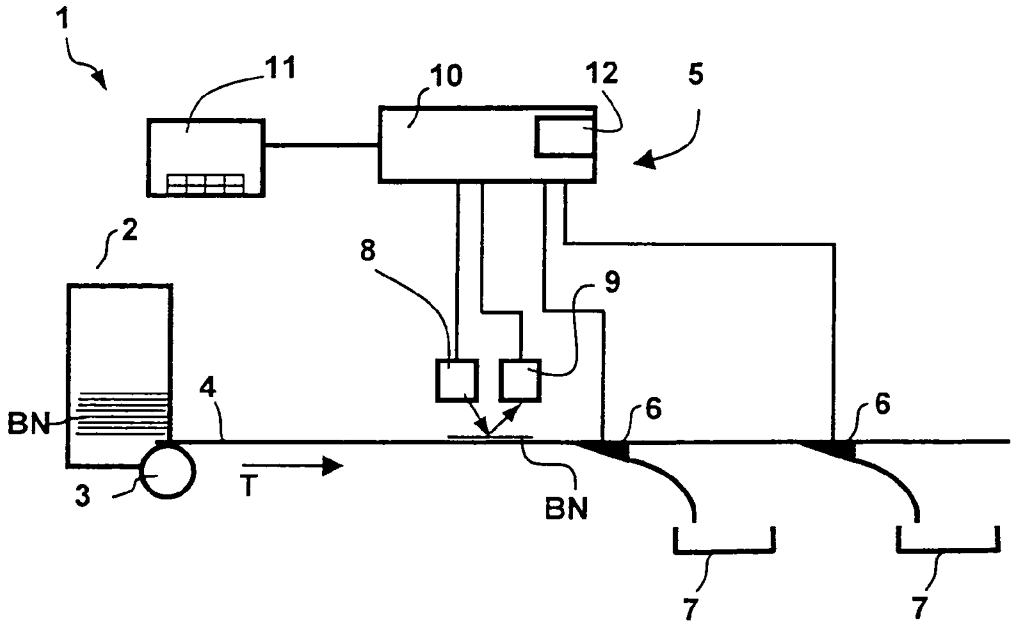
FIG. 1 shows in a schematic view a checking apparatus for the usage in an inventive system according to a first embodiment and FIG. 2 shows a schematic representation of the spectrum of a security feature of a bank note obtained with two different resolutions, with the help of which the principle of the present invention is illustrated.

FIG. 1 in a merely exemplary fashion shows such a sorting apparatus 1. In the way known in the art this apparatus has an input pocket 2, in which the bank notes BN to be checked are put in a stacked fashion, after having been singled by a singler 3 they are transported along a transport way 4 in transport direction T and past a checking apparatus 5, due to the checking result of which the bank notes BN by means of points 6 are sorted into one of several storage compartments 7.

The checking apparatus 5, inter alia, serves for checking the luminescence of the luminescence pigments contained in the bank note paper and for this purpose it comprises an illumination device 8 so as to illuminate the bank notes BN to be checked, a spectrometer as sensor device 9 for detecting the luminescence radiation emitted by the illuminated bank note BN, and an EDP-aided evaluation unit 10, so as to evaluate the signals detected by the sensor device 9. The evaluation unit 10 not necessarily has to be a separate component, but can also be a constituent of the sensor unit 9 or mounted together with the sensor unit 9 in a shared housing.

The present invention is marked by the fact, that for areas with different security categories checking apparatuses 5 with different sensor parameters are made available for checking the same security feature in different ways.

This can mean for example, that the checking apparatus 5, depending on the area of use or pertinent security category, checks the same property of the feature substance with a higher accuracy or another property of the same feature substance.

It can be provided, that when employed in a low-security area only certain optical properties of the feature substance can be checked, whereas in high-security areas also other optical properties and/or also other properties, such as e.g. magnetic properties of the feature substances can be checked.

As already mentioned, for the use in different areas of use different sensor units 9, or in case of the same sensor unit 9 different sensor software, i.e. different evaluation units 10, can be made available, so as to realize the security-category-specific checking with different sensor parameters.

Figure 2:
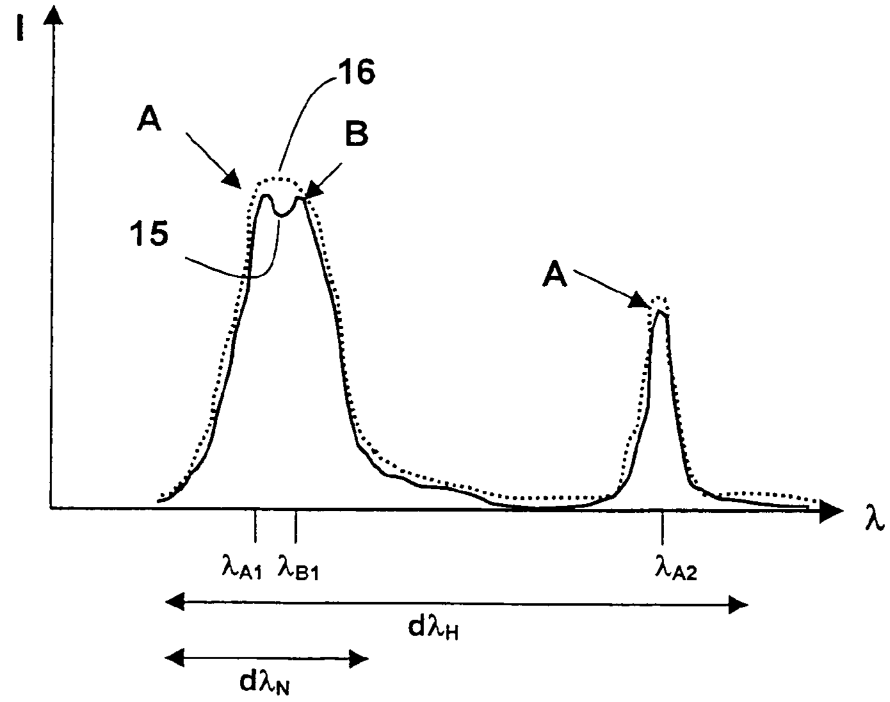

As an example for the checking with different sensor parameters in the following the checking of the spectral behaviour of luminescent feature substances shall be described. FIG. 2 in a schematic fashion shows the measuring curves of the luminescence spectrum of a feature substance obtained with two sensors 5 of different spectral resolution, i.e. the dependence of the measured radiation intensity I on the wavelength $\lambda$ of the luminescence radiation. The continuous curve 15 shows the luminescence spectrum measured with a higher resolution and the dotted curve 16 the luminescence spectrum measured with a lower resolution.

The feature to be checked shall be a mixture of two luminescent substances A and B. In the shown spectral region the substance A by way of example shall have a main maximum at $\lambda_{A1}$ and a secondary maximum at $\lambda_{A2}$. The substance B in the shown spectral region shall have merely a single maximum at a wavelength $\lambda_{B1}$, which in spectral terms shall only be slightly distanced from the maximum $\lambda_{A1}$ of the component A. In the area of the wavelengths $\lambda_{A1}$ and $\lambda_{B1}$ the two substances A and B thus have a strongly overlapping spectrum.

This spectral overlapping of the substances A and B leads to the fact, that only when measuring with a higher resolution, according to the curve 15, the fine structure of the measuring curve in the area of the wavelengths $\lambda_{A1}$ and $\lambda_{B1}$ can be detected. When measuring according to curve 16 with a lower resolution, which cannot detect the differences of the intensity I in the area between the wavelengths $\lambda_{A1}$ and $\lambda_{B1}$ in a resolved fashion, merely the envelope of the total spectrum 16 is measured and details about the fine structure of the spectrum, such as e.g. the different maxima at $\lambda_A$ and $\lambda_B$, cannot be determined.

This has the effect, in particular in the case of the luminescence intensity of the substance B in the area of the wavelength $\lambda_{B1}$ being distinctively lower than that of the substance A in the area of the wavelength $\lambda A_1$, that only when measuring with higher resolution (curve 15) there can be differentiated whether the checked feature substance contains not only the substance A, but also the substance B. Thus, preferably only when checking according to a higher security category, a spectral separation can be effected, i.e. determining the single components A, B in a luminescence feature consisting of several different substances.

If according to the invention for users in areas of a high security category the sensors 5 with higher resolution are provided, and for users in areas with a lower security category only the sensors 5 with lower resolution are provided, then merely in those areas of use with a high security category the differentiation between the single substances A and B with strongly overlapping spectrum can be made, whereas such a differentiation is not possible with the lower resolution according to the measuring curve 16.

This leads to the fact, that only in the areas of use with a high security category the information about the existence of two different substances A and B in the bank notes to be checked can be obtained, while for reasons of the lower measuring accuracy in the area with a lower security category this information inherently cannot be recognized.

This example shows that although the present invention is not restricted to this it is particularly advantageous for checking feature substances contained in the document of value, since the exact composition of these substances usually is kept especially secret, so as to render the creation of forgeries more difficult.

The determination of the spectral course with different resolutions as described above can be achieved on the one hand by making available spectrometers 9 with different resolutions, e.g. due to differently designed diffraction gratings, to the different areas of use. The different sensor parameters, therefore, are due to the different designs of the sensors 9.

Alternatively, it is also possible, that the sensors 9 provided for the different areas of use in principle are of the same design and e.g. also have the same diffraction gratings, and that the different measuring accuracy only exists in a different evaluation of the measured signals. This can e.g. mean that software-controlled in the evaluation unit 10 of the sensor 9 of a lower security category only the measured values according to the curve 16 of FIG. 2 are evaluated, while the software of the evaluation unit 10 of the sensor 9 of a higher security category evaluates the spectrum according to the graph 15 of the FIG. 2.

As already mentioned above, the checking of luminescent substances as security feature in bank notes BN can be effected in different ways not only by measuring with another accuracy, such as e.g. with different spectral resolutions depending on the security category, but additionally or alternatively also by measuring in other spectral regions.

In the special example of FIG. 2 can be provided, for example, that only the checking apparatus 5 or the sensor 9 are able to measure with a high security category in a wavelength range of $d\lambda_H$, which can detect both the main maxima $\lambda_{A1}$, $\lambda_{B1}$, and the secondary maximum $\lambda_{A2}$ which is spectrally spaced-apart therefrom. Contrary to this there can be provided, that the checking apparatus 5 or the sensor 9 of a low security category can measure or evaluate only in a smaller wavelength range $d\lambda_N$, which does not contain the secondary maximum of the wavelength $\lambda_{A2}$. Since this measuring range is excluded, a forger can conclude from an otherwise maybe possible comparing of the relative intensities of the maxima at $\lambda_{A1}$ and $\lambda_{B1}$ neither the actual existence of the substance A nor that of the substance B, which leads to a change of the intensity relation. Due to the similar spectral behaviour when measured with a low resolution and constricted spectral measuring range $d\lambda_N$, a differentiation of the substances A and B, on principle, is not possible.

Because of this, the information, that the security feature of an authentic bank note BN contains both substances A and B and must have a maximum even at the wavelength $\lambda_{A2}$, remains restricted to the use in the high-security area.

Furthermore it is preferred, that the checked documents of value BN have the security feature in the form of a coding, so as to be able to differentiate between different documents of value, such as e.g. different nominal values and/or series, i.e. different issues of a currency system. In this case the sensors of a lower security category will merely be able to check the existence or non-existence of a known coding, whereas only the sensors of a higher security category will be able to detect the special kind of coding.

For example in the case of FIG. 2 it is e.g. thinkable, that there exist several possible combinations of substances with strongly overlapping spectrum, the differences between which can only be recognized when measured with the sensor 9 of a high security category and high resolution, while the sensors 9 of a low security category can only measure the envelope which is not differentiable at this resolution and cannot resolve the differences in the fine structure of the individual codings.

As already mentioned, the measuring can be effected in different ways, not only by measuring with different accuracies, such as e.g. with different spectral resolutions or in different spectral regions. Depending on the security category, also in the different areas of the bank note surface a measuring and/or evaluation can be effected.

Alternatively or additionally, there can preferably also be provided, that in the checking apparatus 5, in dependence on the security category of the area of use, different sensor parameters are activated. A sensor producer can offer, for example, checking apparatuses 5 consisting of sensor 9 and evaluation unit 10, which can carry out both the checking intended for the high-security area as well as that intended for the low-security area. By an activation via software for each different area of use certain software functions can be activated or locked, so that for example only in the area of a high security category the measuring of luminescence can be carried out with a high resolution (curve 15), and in the area of a low security category only a measuring with a low resolution (curve 16) can be carried out.

Furthermore, it is of advantage, when an authorization has to be effected at least in the event when the checking apparatus 5 shall carry out a checking according to the higher security category. This can apply to both the checking apparatuses 5 with activatable software functions as well as to the checking apparatuses 5 which exclusively can carry out checkings according to the higher security category. For the purpose of authorization here e.g. the security category of a user of the checking apparatus 5 or the pertinent machine 1 can be checked. A user can authorize himself e.g. by chip cards, a biometric identification or a PIN entry.

In the example shown in FIG. 1 for this purpose the checking apparatus can have an input unit 11, by means of which the respective user of the bank note sorting apparatus 1 has to authorize himself, e.g. by means of a biometric identification.

One particular advantage of this variation is, that it can be ensured, that even in the case a checking apparatus 5 is taken away from a high-security area, where basically only authorized persons have access to, such a checking apparatus 5 cannot be used with the functions that are usually activated for the authorized user, unless a respective authorization is effected.

According to a further idea of the present invention there can also be provided, that the bank note sorting apparatus 1 or its checking apparatus 5 comprises a GPS (global positioning system) or other system 12, with the help of which the position of the bank note sorting apparatus 1 or checking apparatus 5 can be monitored also via remote monitoring at any time. Preferably, the GPS system 12 will be integrated in a housing of the checking apparatus 5.

This monitoring of the position by means of the GPS system 12 has the further advantage, that an unauthorized taking away of the checking apparatus 5 can be recognized, and that there can be reliably ensured, that the respective checkings can in fact only be carried out in areas of a high security category or only by the users of a high security category. If the GPS system is taken away e.g. without authorization from the usual place of installation of the bank note sorting apparatus 1, an alarm signal can be triggered off and/or the respective checking functions of the software of the sensor 5 in the evaluation unit 10 are locked automatically by the evaluation unit 10 or the software is deleted or destroyed in another fashion.

Instead of such a GPS system 12 there can also be provided, that the checking apparatus 5 has a not shown radio unit, which is in a radio contact with another radio unit, that e.g. is firmly mounted in the high-security area, in which the bank note sorting apparatus 1 is installed. If the radio link between these two radio units is interrupted, because the checking apparatus 5, for example, is removed spatially from this radio circuit, here, too, preferably alarm signals can be produced or the respective software functions be deactivated.

In the aforementioned variations, wherein e.g. via GPS or radio a not authorized removal of the high-security sensor from a high-security area is monitored, can also be provided, that the checking device deliberately outputs wrong checking results, so as to prevent an unauthorized use of the checking device.

According to a further idea of the present invention there can also be provided, that a forgery adaptation of the sensor parameters of the checking apparatus 5 of a low security category is carried out on the basis of the checking results of the checking apparatuses 5 of a higher security category.

For this purpose preferably measured data of not accepted documents of value are stored in the sensor 9 of a higher security category and passed on to a central point, that uses the data for a forgery adaptation, so as to modify the evaluation software of the sensors 9 of a lower security category in the evaluation unit 10 in such a way, that they can recognize a larger number of potential forgeries, without these sensors having to check with a higher measuring accuracy. The adaptation here can also be effected within the sensor, independently of a data transmission to a central point. The forgery adaptation can be carried out by means of a chip card, flashcard or other storage media, which are used for the replacement of the software of the evaluation unit 10. However, the adaptation process can also be effected within the checking apparatus 5, independently of a data transmission to a central point.

Moreover, in particular with machines with a money depositing function, that are installed freely accessible in a low-security area, the checking apparatus 5 can have a so called error counting device, which counts how often it was tried in succession to pay in bank notes which had been checked as not-accepted and were returned.

If not-accepted and thus, possibly, false bank notes or bank notes suspected of forgery are fed in, after a certain number of such abortive attempts the machine 1 or its checking apparatus 5 can be e.g. locked for further checking procedures, and only after activating by an authorized body it is again available for checking procedures. Alternatively, such bank notes used for an adaptation are withhold directly in the machine 1 as suspected forgeries and are not returned to the customer. This has the advantage, that the authorized bodies due to the analysis of the withhold false adaptation bank notes are able to better and earlier find out the forgers and their forgery methods. Alternatively, an external observation device, e.g. a camera can be activated or an already activated record can be provided with additional information. The additional information can be deposited e.g. in a log-file, so as to be able to specifically examine the scene.

This proceeding has the advantage, that a potential forger cannot adapt his forgeries at the machine 1 by feeding in different variations of his forgeries so long as a forgery is accepted as supposedly authentic by the checking apparatus 5 of a low security category. Because of this a production of forgeries is made more difficulty, despite the use of sensors of a lower security category in freely accessible areas.

This has to be taken into account, since for example in the case of FIG. 2 the sensors 9 with a lower resolution, according to curve 16, cannot differentiate whether in the bank note BN is contained the substance A or B or even both substances A and B, and thus in low-security areas, possibly, forgeries may be accepted that contain only one substance A or B.

If checking apparatuses 5 are used, in which the sensors 9 for low-security and high-security category in fact have the same design and depending on the security category the different checking is effected merely due to different software algorithms, there can be provided, that the checking apparatus can perform the checking of a high security category and at the same time the checking of a low security category. This is of advantage e.g. when a forgery adaptation is effected within the checking apparatus 5. It is e.g. thinkable, that when employing the sensor for checking in a low-security area, in fact merely the result of the low-security checking is given out and used, but the result of the high-security checking obtained at the same time is used internally for an adaptation of the software algorithms of the low-security category and/or sent to the central point for further evaluation.

This method, too, can be employed particularly advantageous in so-called recycling devices, i.e. in cash machines, at which the customer can pay in bank notes to be credited to his account and debit the account and have the money paid out. Especially in these devices, in which bank notes paid in in prior transactions are paid out again in subsequent transactions, it is particularly important, that a quick recognition of the existence of new forgeries or an adaptation of the evaluation algorithms to these new forgeries is effected, which are not recognized by the existing evaluation algorithms, since with such cash machines the acceptability of the bank notes is effected only on the basis of the checking of the low security category.

Here can be provided, that the data for high-security checking and/or low-security checking of every checked bank note are sent to the central point for further evaluation, such as e.g. a central computer of a central bank, or a body authorized thereby, connected to several cash machines via data lines, or that such data are only sent when the checking result of the high-security checking of a bank note differs from the checking result of the low-security checking of the same bank note and the bank note, when low-security is checked, is recognized e.g. as authentic, while the high-security checking classifies the bank note to be false.

If sufficient money depositing machines or recyclers in a region are equipped with the sensor system for carrying out the high-security checking, which are connected to a central computer of a central bank or a body authorized thereby, such a forgery will be detected with a high probability in one of the suitably equipped machines. With the help of the accompanying information for the central bank it is reliably prevented that new forgery classes, which money depositing machines/recyclers without a sensor system for carrying out the high-security checking do not recognize, arise more frequently in a region and are identified as new forgeries only with delay by transports to the cash centers of the central bank. Instead of in a money-depositing machine or recycler the sensor for carrying out the high-security checking can also be integrated with respective security measures in a bank note processing machine located in a local cash center of e.g. a bank or a shopping center.

Furthermore, there can also be provided, that the sensors 5 of the different security categories in fact measure, for example, with the same accuracy and in the same spectral region at the same place, but the different checking is effected or supplemented by a measuring of further properties of the same security feature.

For example, a luminescence check can be combined with a magnetic check, and only the sensor with a higher security category is able to carry out this magnetic measuring at all or with a higher accuracy than the sensor of a lower security category.

I.e. the inventive checking of the same security feature in different ways in different areas of use can ensure, that certain information about the security features of the documents of value are checked and therefore recognized only in areas of a high security category. The present invention is of particular advantage when feature substances in bank notes are checked and in particular when their luminescence behaviour is checked.

The invention claimed is:

1. A system for checking security features of a document of value comprising at least two checking apparatuses, the checking apparatuses being assigned to areas with different security categories and comprising at least one sensor, respectively, wherein the checking apparatuses, in dependence of the security category, provide different sensor parameters for checking the security feature with the at least one sensor, respectively, so as to check the same security feature in different ways, and wherein in areas of a lower security category the checking includes a check of a property of the security feature and only in areas with a higher security category the same property of the security feature is checked with a higher accuracy.

2. The system according to claim 1, wherein, for checking with different sensor parameters, said at least one sensor comprises differently designed sensors with different measuring parameters.

3. The system according to claim 1, wherein, for checking with different sensor parameters, said at least one sensor comprises sensors of the same design with the same measuring parameters, but different evaluation parameters.

4. The system according to claim 1, wherein the at least one sensor comprises a security device, enabling checking of an authorization to use.

5. The system according to claim 4, wherein the security device enables an authorization by means of a solid-state storage medium.

6. The system according to claim 1, wherein, in dependence on the security category, different sensor parameters are activated.

7. The system according to claim 1, wherein, for checking the document of value, both the checking of a higher and the checking of a low security category are carried out.

8. The system according to claim 1, wherein a forgery adaptation of the sensor parameters of the at least one sensor of a lower security category is carried out on the basis of checking results of the sensing of a higher security category.

9. The system according to claim 8, wherein measured data of not-accepted documents of value are either or both stored in a sensor of a higher security category and used for the forgery adaptation.

10. The system according to claim 1, wherein a checking of luminescent substances as security feature is carried out.

11. The system according to claim 10, wherein in areas with a lower security category in comparison to areas with a higher security category, the luminescence radiation is checked in a different way.

12. The system according to claim 10, wherein, in areas with a lower security category, an envelope of the spectral course of the security feature is checked and only in areas with a higher security category the spectral course is checked with a higher spectral resolution, so as to determine substructures of the envelope.

13. The system according to claim 10, wherein, only when checking in areas with a higher security category, a spectral separation is effected.

14. The system according to claim 10, wherein, in areas with different security categories, the decay behaviour of the luminescence radiation is determined in different ways.

15. The system according to claim 1, wherein the documents of value have the security feature in the form of a coding, so as to differentiate between different documents of value, and the at least one sensor comprises sensors of a lower security category which are adapted to only check an existence or a non-existence of a known coding, and sensors of a higher security category which alone are adapted to check a special kind of coding.

16. The system according to claim 1, wherein said at least one sensor comprises a single sensor for checking the document of value, said single sensor adapted to carry out both the checking of a higher and the checking of a lower security category.

17. The system according to claim 1, wherein in a cash machine an acceptability of documents of value is enabled only on a basis of the checking of a lower security category.

18. The system according to claim 1, wherein either or both measured data of a sensor for checking security features of the document of value are used for forgery adaptation and measured data of the sensor are transmitted to an external facility.

* * * * *